US007853398B2

(12) United States Patent
Hirowatari et al.

(10) Patent No.: US 7,853,398 B2
(45) Date of Patent: Dec. 14, 2010

(54) FUEL PRESSURE CONTROL APPARATUS FOR AN INTERNAL COMBUSTION ENGINE

(75) Inventors: Seiji Hirowatari, Toyota (JP); Masanao Idogawa, Toyota (JP); Masahiko Teraoka, Toyota (JP); Toshitaka Fujiki, Iwata (JP)

(73) Assignees: Toyota Jidosha Kabushiki Kaisha, Aichi-Ken (JP); Yamaha Hatsudoki Kabushiki Kaisha, Shizuoka-Ken (JP)

( * ) Notice: Subject to any disclaimer, the term of this patent is extended or adjusted under 35 U.S.C. 154(b) by 366 days.

(21) Appl. No.: 12/064,943

(22) PCT Filed: Aug. 15, 2006

(86) PCT No.: PCT/JP2006/316290

§ 371 (c)(1),
(2), (4) Date: Feb. 26, 2008

(87) PCT Pub. No.: WO2007/023753

PCT Pub. Date: Mar. 1, 2007

(65) Prior Publication Data

US 2009/0093943 A1 Apr. 9, 2009

(30) Foreign Application Priority Data

Aug. 26, 2005 (JP) ............................ 2005-246391

(51) Int. Cl.
*B60T 7/12* (2006.01)
*F02M 1/00* (2006.01)

(52) U.S. Cl. ........................ 701/104; 123/434; 123/299

(58) Field of Classification Search ................. 701/103, 701/104, 114, 115; 123/294, 295, 299, 434, 123/673, 680, 681
See application file for complete search history.

(56) References Cited

U.S. PATENT DOCUMENTS

| | | | | |
|---|---|---|---|---|
| 5,975,044 | A * | 11/1999 | Kamura et al. | 123/295 |
| 6,701,905 | B1 | 3/2004 | Gaskins | |
| 7,017,551 | B2 * | 3/2006 | Shimizu | 123/399 |
| RE39,137 | E * | 6/2006 | Kamura et al. | 123/295 |

(Continued)

FOREIGN PATENT DOCUMENTS

EP 0 785 350 A2 7/1997

(Continued)

OTHER PUBLICATIONS

JP Office Action for corresponding Japanese Patent Application No. 2005-246391 mailed Jun. 22, 2010.

(Continued)

*Primary Examiner*—John T Kwon
(74) *Attorney, Agent, or Firm*—Sughrue Mion, PLLC

(57) ABSTRACT

The engine ECU executes a program including the step of setting an upper limit guard value of a fuel pressure by executing low fuel pressure control in the case where a low fuel pressure control execution condition is satisfied with fulfillment of conditions that execution of the low fuel pressure control is permitted, that engine speed NE is lower than a threshold value, and that the atmospheric pressure is higher than a threshold value, and the step of controlling the fuel pressure to be a target fuel pressure within a range not exceeding the upper limit guard value.

5 Claims, 6 Drawing Sheets

U.S. PATENT DOCUMENTS

| | | | | |
|---|---|---|---|---|
| 2005/0016502 | A1 | 1/2005 | Reischl et al. | |
| 2005/0098157 | A1 | 5/2005 | Ohtani | |
| 2005/0205055 | A1 * | 9/2005 | Shimizu | 123/346 |
| 2006/0137668 | A1 * | 6/2006 | Honda et al. | 123/674 |

FOREIGN PATENT DOCUMENTS

| | | | |
|---|---|---|---|
| EP | 0 916 830 | A2 | 5/1999 |
| EP | 1 411 234 | A1 | 4/2004 |
| EP | 1 531 262 | A2 | 5/2005 |
| JP | 8-200119 | A | 8/1996 |
| JP | 9-21369 | A | 1/1997 |
| JP | 10-018890 | A | 1/1998 |
| JP | 11-294241 | A | 10/1999 |
| JP | 2001-227390 | A | 8/2001 |
| JP | 2002-332889 | A | 11/2002 |
| JP | 2005-146884 | A | 6/2005 |
| JP | 2005-171821 | A | 6/2005 |
| KR | 10-2002-0084383 | A | 11/2002 |
| KR | 10-2005-0045915 | A | 5/2005 |

OTHER PUBLICATIONS

Japanese Office Action dated Dec. 15, 2009 (with translation) (6 pages).

* cited by examiner

| | | | | | | | |
|---|---|---|---|---|---|---|---|
| LOAD FACTOR (%) | 5 | 10 | 15 | 20 | 25 | 30 | ··· |
| UPPER LIMIT GUARD VALUE (MPa) | 2 | 4 | 8 | 14 | 22 | 32 | ··· |

FUEL PRESSURE CONTROL APPARATUS FOR AN INTERNAL COMBUSTION ENGINE

TECHNICAL FIELD

The present invention relates to a control apparatus for an engine, and more particularly to a control apparatus for an engine in which a fuel pressure is adjusted to be either a first pressure or a second pressure.

BACKGROUND ART

Conventionally, an amount of fuel injected to an engine is controlled by controlling a period of injection of the fuel from an injector. In the injector, an electric current is supplied to a solenoid to slide a needle blocking the injection hole of the injector so as to open the injection hole. Thus, the fuel injection period from the injector is decided according to the period during which an electric current is supplied to the solenoid. When this current-supplying period to the solenoid is sufficiently long, the needle will move accurately, and thus, the fuel injection period and, hence, the fuel injection amount can be controlled appropriately. If the current-supplying period to the solenoid is short, the amount of movement of the needle is insufficient, causing unstable movement thereof. This may lead to unstable fuel injection period and, hence, unstable fuel injection amount. Accordingly, a lower limit is provided for the fuel injection period. With provision of such a lower limit for the fuel injection period, however, it is not possible to reduce the fuel injection amount by reducing the fuel injection period beyond the lower limit. As such, there is a technique to reduce the amount of the fuel injected per unit time by lowering the pressure of the fuel (fuel pressure) in the case where the fuel injection period becomes short to reach the lower limit (when the fewer fuel injection amount is required).

Japanese Patent Laying-Open No. 09-021369 discloses a fuel injection control apparatus for an internal combustion engine, which includes a fuel pressurizing portion that pressurizes fuel, a fuel injection portion that injects the fuel pressurized by the fuel pressurizing portion, a fuel injection amount setting portion that sets the amount of the fuel to be injected by the fuel injection portion in accordance with an engine operation state, an injection start timing setting portion that sets the injection start timing with respect to a prescribed injection end timing based on the fuel injection amount set by the fuel injection amount setting portion, and a pressure changing portion that lowers the pressure of the fuel pressurizing portion when the fuel injection amount set by the fuel injection amount setting portion is small.

According to the fuel injection control apparatus described in this publication, the injection start timing setting portion sets the injection start timing with respect to a prescribed injection end timing, based on the injection amount set by the fuel injection amount setting portion in accordance with the engine operation state. When the fuel injection amount set by the fuel injection amount setting portion is small, the pressure changing portion controls to lower the pressurizing force of the fuel pressurizing portion, and thus, the fuel pressure is lowered. As such, it is possible to reduce the amount of the fuel injected per unit time.

When the pressure of the fuel pressurizing portion, i.e., the fuel pressure, is lowered as in the fuel injection control apparatus described in Japanese Patent Laying-Open No. 09-021369, however, atomization of the fuel would be degraded (the fuel injected in the atomized state would decrease). With degradation in atomization of the fuel, the combustion state of the air-fuel mixture would change, leading to large variation in output of the engine.

DISCLOSURE OF THE INVENTION

An object of the present invention is to provide a control apparatus for an engine that can suppress variation in output due to lowering of the fuel pressure.

A control apparatus for an engine according to an aspect of the present invention includes: a control portion controlling a fuel injection mechanism injecting fuel; an adjusting portion executing one of first control for adjusting a pressure of the fuel to be a first pressure and second control for adjusting the pressure to be a second pressure lower than the first pressure; a detecting portion detecting an atmospheric pressure; and a prohibiting portion prohibiting switching from the first control to the second control when the atmospheric pressure is lower than a predetermined pressure.

According to this invention, the fuel is injected from the fuel injection mechanism. The fuel pressure is adjusted to be the first pressure, or to be the second pressure lower than the first pressure. In the case where the fuel pressure is adjusted to be the second pressure, the fuel injected in the atomized state will decrease due to the reduction of the fuel pressure, which may cause degradation in atomization of the fuel. At this time, if the atmospheric pressure is low and the intake air amount is small, the unstable combustion state will become more unstable, leading to large variation in output of the engine. It may possibly lead to engine stall. Thus, in the case where the atmospheric pressure is lower than a predetermine pressure, switching from the first control to the second control is prohibited. This can suppress lowering of the fuel pressure in the unstable combustion state, and thus, a sudden change of the combustion state can be suppressed. As a result, it is possible to provide a control apparatus for an engine that can suppress variation of the output due to lowering of the fuel pressure.

A control apparatus for an engine according to another aspect of the present invention includes: a control portion controlling a fuel injection mechanism injecting fuel; an adjusting portion executing one of first control for adjusting a pressure of the fuel to be a first pressure and second control for adjusting the pressure to be a second pressure lower than the first pressure at least in a region where an engine load is lower than a predetermined load and having a difference with the first pressure smaller when the engine load is high than when the engine load is low; and a permitting portion permitting switching from the first control to the second control when the engine load is higher than a predetermined load.

According to this invention, the pressurized fuel is injected from the fuel injection mechanism. The fuel pressure is adjusted to be the first pressure, or to be the second pressure that is lower than the first pressure at least in the region where the engine load is lower than a predetermined load, and that has a difference with the first pressure that is smaller when the engine load is high than when the engine load is low. In the case where the fuel pressure is adjusted to be the second pressure, the fuel injected in the atomized state will decrease due to the decrease in fuel pressure, which may cause degradation in atomization of the fuel. With the degradation in atomization of the fuel, the combustion state of the air-fuel mixture will change. As such, if the fuel pressure is lowered from the first pressure to the second pressure in the operation state where the difference between the first pressure and the second pressure is large, the combustion state of the air-fuel mixture will rapidly change, which may cause large variation in output of the engine. Thus, according to this invention, switching from the first control to the second control is permitted when the engine load is higher than a predetermined load. That is, the control is switched in the high load state where the difference between the first and second pressures is small, while switching of the control is prohibited in the low load state where the difference between the first and second pressures is large. This can suppress large variation in fuel pressure at the time of switching of control. As a result, it is possible to provide a control apparatus for an engine that can suppress variation in output of the engine due to lowering of the fuel pressure.

A control apparatus for an engine according to a further aspect of the present invention includes: a control portion controlling a fuel injection mechanism injecting fuel; a correcting portion correcting a fuel injection amount; an adjusting portion executing one of first control for adjusting a pressure of the fuel to be a first pressure and second control for adjusting the pressure to be a second pressure lower than the first pressure; and a switching portion switching from the first control to the second control when a correction amount for decreasing the fuel injection amount is greater than a predetermined correction amount.

According to this invention, the pressurized fuel is injected from the fuel injection mechanism. The fuel injection amount is corrected based on an air-fuel ratio, for example. The fuel pressure is adjusted to be the first pressure, or to be the second pressure that is lower than the first pressure. In the case where the fuel pressure is adjusted to be the second pressure, the fuel injected in the atomized state will decrease due to the lowering of the fuel pressure, possibly leading to degradation in atomization of the fuel. With degradation in atomization of the fuel, the combustion state of the air-fuel mixture will change. If the fuel pressure is lowered from the first pressure to the second pressure after the required fuel injection amount is actually reduced, for example, the unstable combustion state due to such a small fuel injection amount may become more unstable. In this case, the output of the engine may also vary considerably. Thus, according to this invention, the first control is switched to the second control in the case where the correction amount for decreasing the fuel injection amount is greater than a predetermined correction amount and it can be said that the fuel injection period is highly likely to reach the lower limit. This allows the fuel pressure to be lowered in advance before the fuel injection amount becomes actually small (in the state where the fuel injection amount after the reduction correction is large). Thus, in the state where the fuel injection amount (after the reduction correction) is small and the combustion state is unstable, the combustion state is prevented from becoming more unstable. As a result, it is possible to provide a control apparatus for an engine that can suppress variation in output due to lowering of the fuel pressure.

Preferably, the correcting portion performs correction to decrease the fuel injection amount when an air-fuel ratio in the engine is lower than a predetermined air-fuel ratio.

According to this invention, correction (lean correction) to decrease the fuel injection amount is carried out when the air-fuel ratio is richer than a predetermined air-fuel ratio (e.g., stoichiometric air-fuel ratio). When the correction amount by such reduction correction is greater than a predetermined correction amount and it can be said that the fuel injection period is highly likely to reach the lower limit, the first control is switched to the second control. As such, the fuel pressure can be lowered in advance before the fuel injection amount becomes actually small (in the state where the fuel injection amount after the reduction correction is large). Thus, in the state where the fuel injection amount (after the reduction correction) is small and the combustion state is unstable, the combustion state is prevented from becoming more unstable. As a result, it is possible to suppress variation in output due to the lowering of the fuel pressure.

BEST MODES FOR CARRYING OUT THE INVENTION

Figure 1:
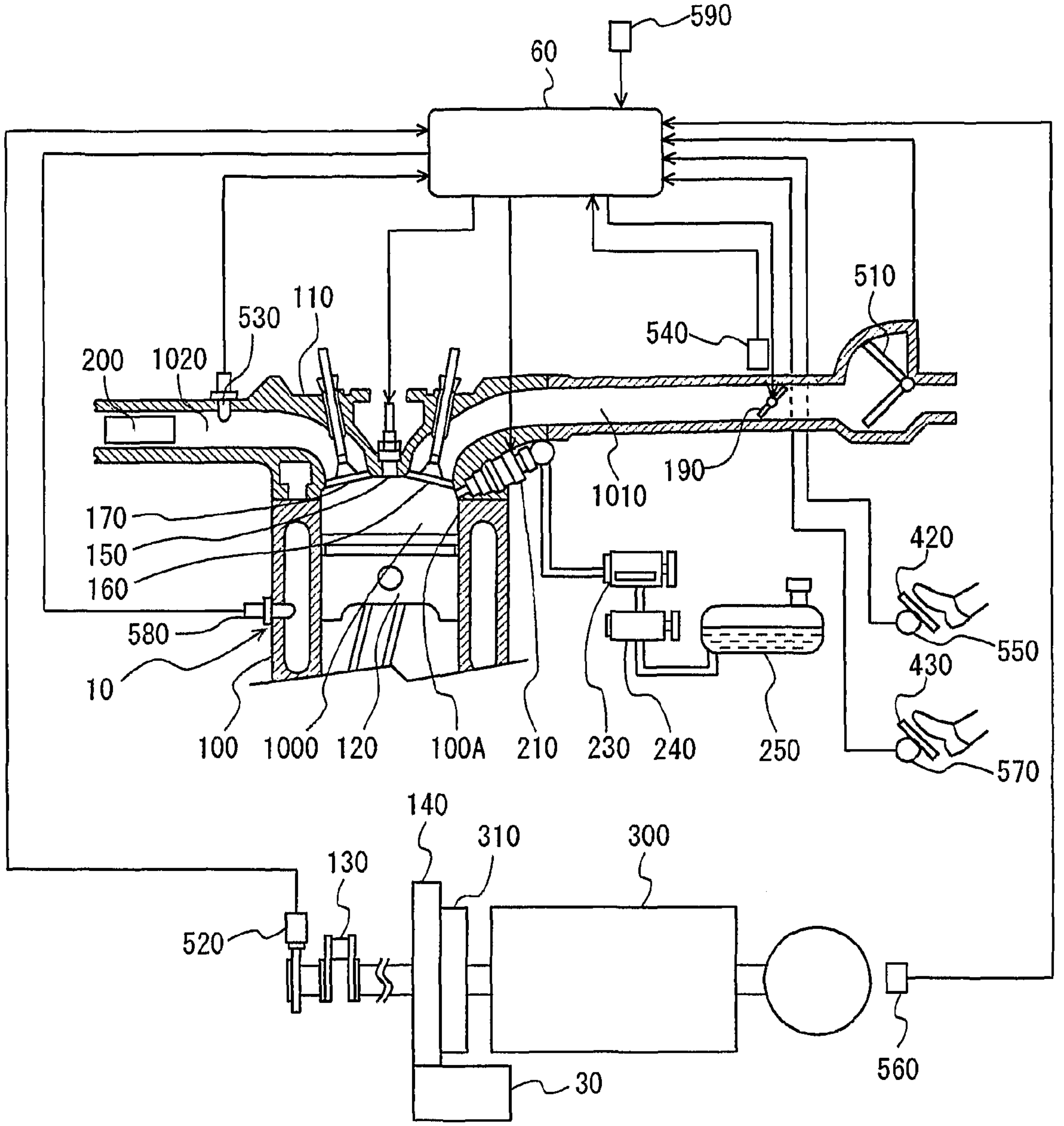
FIG. 1 shows an overall configuration of an engine controlled by a control apparatus according to an embodiment of the present invention.

Hereinafter, an embodiment of the present invention will be described with reference to the drawings. In the following, the same or corresponding portions have the same reference characters allotted. Their designation and function are also identical. Thus, detailed description thereof will not be repeated.

FIG. 1 shows an overall configuration of a direct injection engine controlled by a control apparatus of the present invention. The engine main body 10 has a cylinder block 100 with a cylinder head 110 covering its top. A piston 120 is held in a slidable manner in a cylinder 100A formed at cylinder block 100. The reciprocating motion of piston 120 in cylinder 100A is transformed to a rotary motion of a crankshaft 130, which is transmitted to a transmission 300 and the like. At the time of engine startup, crankshaft 130 is connected to a starter 30 via a fly wheel 140. A clutch 310 is provided between fly wheel 140 and transmission 300.

In the present embodiment, transmission 300 is a manual transmission of which speed is changed by a manual operation of the driver. Clutch 310 is engaged or disengaged by an operation of the driver.

A combustion chamber 1000 is formed above piston 120, which is partitioned by cylinder block 100 and cylinder head 110. An air-fuel mixture is burned inside combustion chamber 1000, and the explosive power causes the reciprocating motion of piston 120. The air-fuel mixture is ignited with a spark plug 150 arranged to penetrate cylinder head 110 and protrude into combustion chamber 1000.

The air constituting the air-fuel mixture is supplied via cylinder head 110 and an intake path 1010 formed inside an intake pipe connected to cylinder head 110. Exhaust from combustion chamber 1000 is delivered via an exhaust path 1020. Cylinder head 110 is provided with an intake valve 160 that switches connection/disconnection between intake path 1010 and combustion chamber 1000, and an exhaust valve 170 that switches connection/disconnection between exhaust path 1020 and combustion chamber 1000.

A flap-type throttle valve 190 is provided inside the intake pipe, which adjusts the airflow inside intake path 1010 in accordance with its degree of opening. More specifically, throttle valve 190 adjusts the intake air amount of the engine. Throttle valve 190 is of an electromagnetic type, which is activated by an actuator. A valve for adjusting the intake air amount during idling may be provided in addition to throttle valve 190. The intake air amount may be adjusted by adjusting the lift amount of intake valve 160 instead of or in addition to adjustment of the degree of opening of throttle valve 190.

A catalyst 200 is provided downstream of exhaust path 1020. Catalyst 200 is a three-way catalyst. Catalyst 200 purifies the air-fuel mixture after combustion, i.e., exhaust gas. The exhaust gas purified by catalyst 200 is discharged to the outside of the vehicle.

The fuel constituting the air-fuel mixture is supplied via an injector 210 of an electromagnetic type. Injector 210 is arranged to penetrate cylinder head 110, and is configured to inject fuel from a tip-end nozzle portion into combustion chamber 1000 (into the cylinder). An injector injecting fuel into an intake port or intake path 1010 may be provided instead of or in addition to injector 210.

A low-pressure pump 240 and a high-pressure pump 230 increase the pressure of the fuel suctioned from a fuel tank 250 in two steps to supply the resultant fuel to injector 210. High-pressure pump 230 is driven by motive power transmitted from crankshaft 130 in the engine main body 10 via a belt and the like. Low-pressure pump 240 is driven by an electric motor. At the time of startup, injector 210 is also supplied with fuel from low-pressure pump 240.

An engine control computer (hereinafter, referred to as an engine ECU (Electronic Control Unit)) 60 is provided to control the engine parts such as spark plug 150, throttle valve 190, injector 210 and the like. Engine ECU 60 has atypical configuration including a CPU (Central Processing Unit), a RAM (Random Access Memory), an SRAM (Static Random Access Memory), and a ROM (Read Only Memory), and activates spark plug 150, outputs a control signal to throttle valve 190 to adjust the degree of opening of throttle valve 190 (throttle opening position), and supplies an electric current to injector 210 by a control signal so as to open the nozzle of injector 210 at a prescribed timing for a prescribed period, based on detection signals from various sensors and the like.

The period during which the nozzle of injector 210 is opened, i.e., the fuel injection period, has a lower limit set. If the fuel injection period is extremely short, a needle blocking the injection hole of injector 210 would not move accurately, in which case it would be difficult to inject fuel of a target fuel injection amount.

The sensors connected to engine ECU 60 include an airflow meter 510, a crank angle sensor 520, an A/F sensor 530, a throttle position sensor 540, an accelerator position sensor 550, a vehicle speed sensor 560, a coolant temperature sensor 580, and an atmospheric pressure sensor 590.

Airflow meter 510 measures the amount of air flowing within intake path 1010. Crank angle sensor 520 outputs a pulse signal for detecting engine speed NE. A/F sensor 530 measures an air-fuel ratio in exhaust path 1020. Throttle position sensor 540 detects the degree of opening of throttle valve 190. Accelerator position sensor 550 detects the degree of opening (depressed amount) of the accelerator pedal 420. Vehicle speed sensor 560 outputs a pulse signal for detecting vehicle speed (rotation of wheels). Coolant temperature sensor 580 detects the temperature of the engine coolant representing the temperature of the engine. Atmospheric pressure sensor 590 detects the atmospheric pressure outside the vehicle.

When the driver manipulates the key at the time of startup, engine ECU 60 receives the ignition (IG) ON signal and a starter ON signal. When the stroke level of the clutch pedal 430 becomes the maximum level, a neutral start switch 570 is turned ON, and the ON signal is input to engine ECU 60.

Engine ECU 60 controls the fuel injection amount based on the intake air amount detected by airflow meter 510 and the like. At this time, engine ECU 60 controls the injection amount and the injection period in accordance with the engine speed and the engine load, based on the signals from the various sensors, so as to achieve an optimal combustion state. In this engine main body 10, the control of the injection period and the control of the injection amount are carried out simultaneously to directly inject the fuel into the cylinder. Further, engine ECU 60 carries out ignition timing control, based on the signals detected by crank angle sensor 520, a cam position sensor and the like (including a knocking sensor), so as to achieve an optimal ignition timing. Such control can realize both high power output and low exhaust emission of engine main body 10.

Further, in the present embodiment, engine ECU 60 carries out feedback control of the air-fuel ratio detected with A/F sensor 530. It calculates a feedback correction amount of the fuel injection amount and its learn value (representing the amount of constant deviation of the fuel injection amount) such that the air-fuel ratio becomes a target air-fuel ratio (e.g., stoichiometric air-fuel ratio).

In the present embodiment, it is calculated such that the feedback correction amount increases when the air-fuel ratio is lean (leaner than the stoichiometric air-fuel ratio), and such that the feedback correction amount decreases when the air-fuel ratio is rich (richer than the stoichiometric air-fuel ratio).

The learn value is calculated for each learning region divided in accordance with the intake air amount. When a predetermined learning condition is satisfied, an update amount determined based on a map is added to or decreased from a previously calculated learn value to thereby obtain a new learn value. The predetermined learning condition may be, for example, a condition that the average value of the feedback correction amounts (control center value) is smaller than a threshold value (1), or a condition that the same is greater than a threshold value (2) (threshold value (2)>threshold value (1)).

A smaller learn value is obtained with a more excess fuel injection amount (i.e., the greater the actual fuel injection amount than the target fuel injection amount). Meanwhile, a greater learn value is obtained with a more insufficient fuel injection amount (i.e., the smaller the actual fuel injection amount than the target fuel injection amount).

With a positive feedback correction amount, the fuel injection amount is increased, while it is decreased with a negative feedback correction amount. Similarly, the fuel injection amount is increased with a positive learn value, while it is decreased with a negative learn value. The ultimate fuel correction amount by the feedback control of the air-fuel ratio corresponds to a sum of the feedback correction amount and the learn value.

It is noted that common techniques known to the public may be used for the feedback correction amount and the learn value, and therefore, further detailed description thereof will not be provided here.

Figure 2:
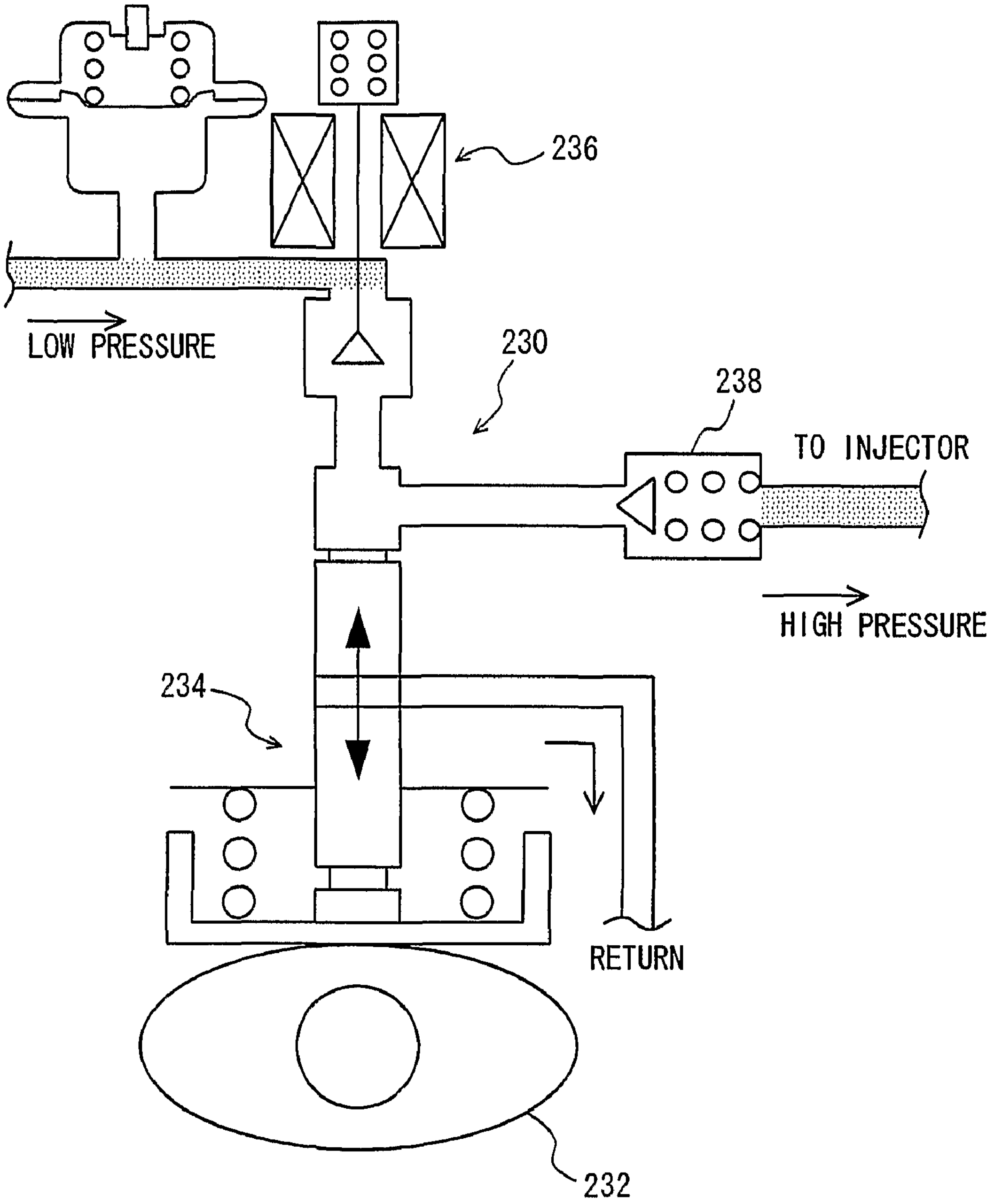
FIG. 2 is a partially enlarged view of FIG. 1.

Referring to FIG. 2, high-pressure pump 230 will further be described. High-pressure pump 230 has, as its main components, a pump plunger 234 driven by a cam 232 to slide up and down, an electromagnetic spill valve 236 and a check valve 238.

During the time when pump plunger 234 is moved downward by cam 232, the fuel is introduced (suctioned) while electromagnetic spill valve 236 is open. The amount of the fuel discharged from high-pressure pump 230 is controlled by changing the timing to close electromagnetic spill valve 236 while pump plunger 234 is moved upward by cam 232.

In the pressurizing stroke during which pump plunger 234 is moved upward, the fuel of a greater amount is discharged as the timing to close electromagnetic spill valve 236 is earlier, whereas the fuel of a smaller amount is discharged as the timing to close the valve is later. The drive duty of electromagnetic spill valve 236 when the greatest amount of fuel is discharged is set to 100%, and the drive duty of electromagnetic spill valve 236 when the smallest amount of fuel is discharged is set to 0%. When the drive duty is 0%, electromagnetic spill valve 236 remains open, in which case, although pump plunger 234 slides up and down as long as cam 232 continues to rotate (along with rotation of the engine), the fuel is not pressurized because electromagnetic spill valve 236 does not close.

The pressurized fuel presses and opens check valve 238, and is delivered to injector 210. The amount of fuel discharged from high-pressure pump 230 is adjusted using the drive duty, whereby the fuel pressure is adjusted.

The target value of the fuel pressure, i.e., the target fuel pressure, is calculated using a predetermined two-dimensional map, with engine speed NE and load factor KL as parameters. It is calculated such that the target fuel pressure becomes higher with the higher load factor KL (with the higher engine load).

In the present embodiment, fuel pressure is controlled, not only by high fuel pressure control, with which the fuel pressure is controlled to be a target fuel pressure, but also by low fuel pressure control, with which an upper limit guard value is set for the fuel pressure. The upper limit guard value is set using a one-dimensional map with the load factor as a parameter, as shown in FIG. 3.

The map for setting the upper limit guard value is created such that the fuel injection amount before conducting the low fuel pressure control from which a value (e.g., 40%) predetermined by a learn value is decreased becomes equal to the fuel injection amount after conducting the low fuel pressure control, provided that the fuel injection period is identical before and after execution of the low fuel pressure control.

That is, the upper limit guard value is set such that the fuel injection amount before execution of the low fuel pressure control decreased by a value (e.g., 40%) predetermined by a learn value becomes equal to the fuel injection amount after execution of the low fuel pressure control, on the assumption that the fuel injection period is constant before and after execution of the low fuel pressure control.

Figures 3, 4:
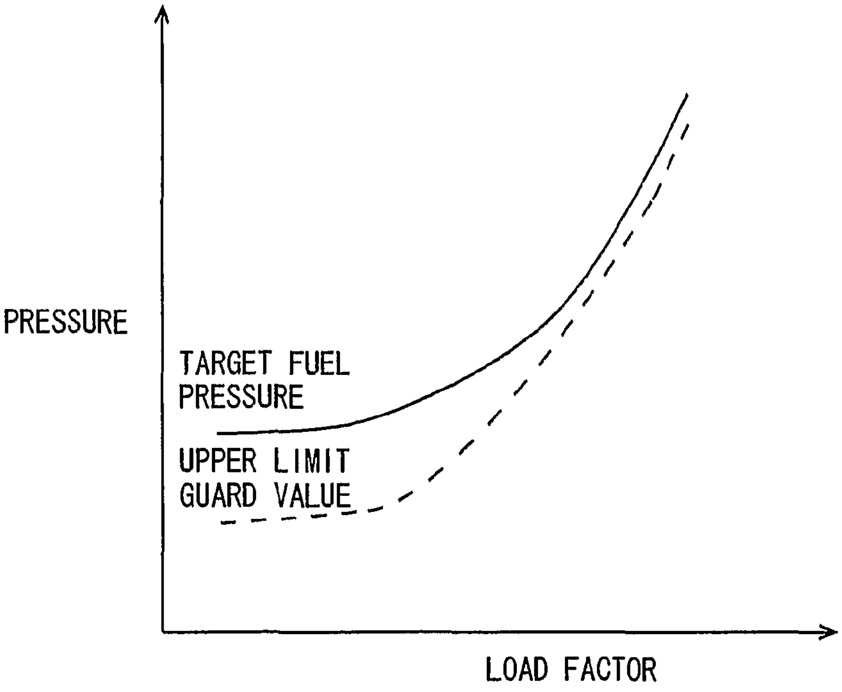
FIG. 3 is a map for setting an upper limit guard value of fuel pressure.
FIG. 4 shows comparison between target fuel pressure and the upper limit guard value.

Here, the target fuel pressure is set to be lower when the load factor is lower than when the load factor is higher, as shown in FIG. 4. Thus, the upper limit guard value is also lower with the lower load factor than with the higher load factor. Further, a difference between the target fuel pressure and the upper limit guard value is smaller when the load factor is high than when it is low.

The upper limit guard value is set to be lower than a normal target fuel pressure at least in a low load region where the engine load (load factor) is lower than a predetermined load (load factor).

It is noted that the upper limit guard value may be set based on a product of the load factor and an increase coefficient that is set for increasing the fuel injection amount, when the coolant temperature is low, when the throttle valve is in its full open position, or at the time of suppressing overheat of catalyst 200.

Figure 5:
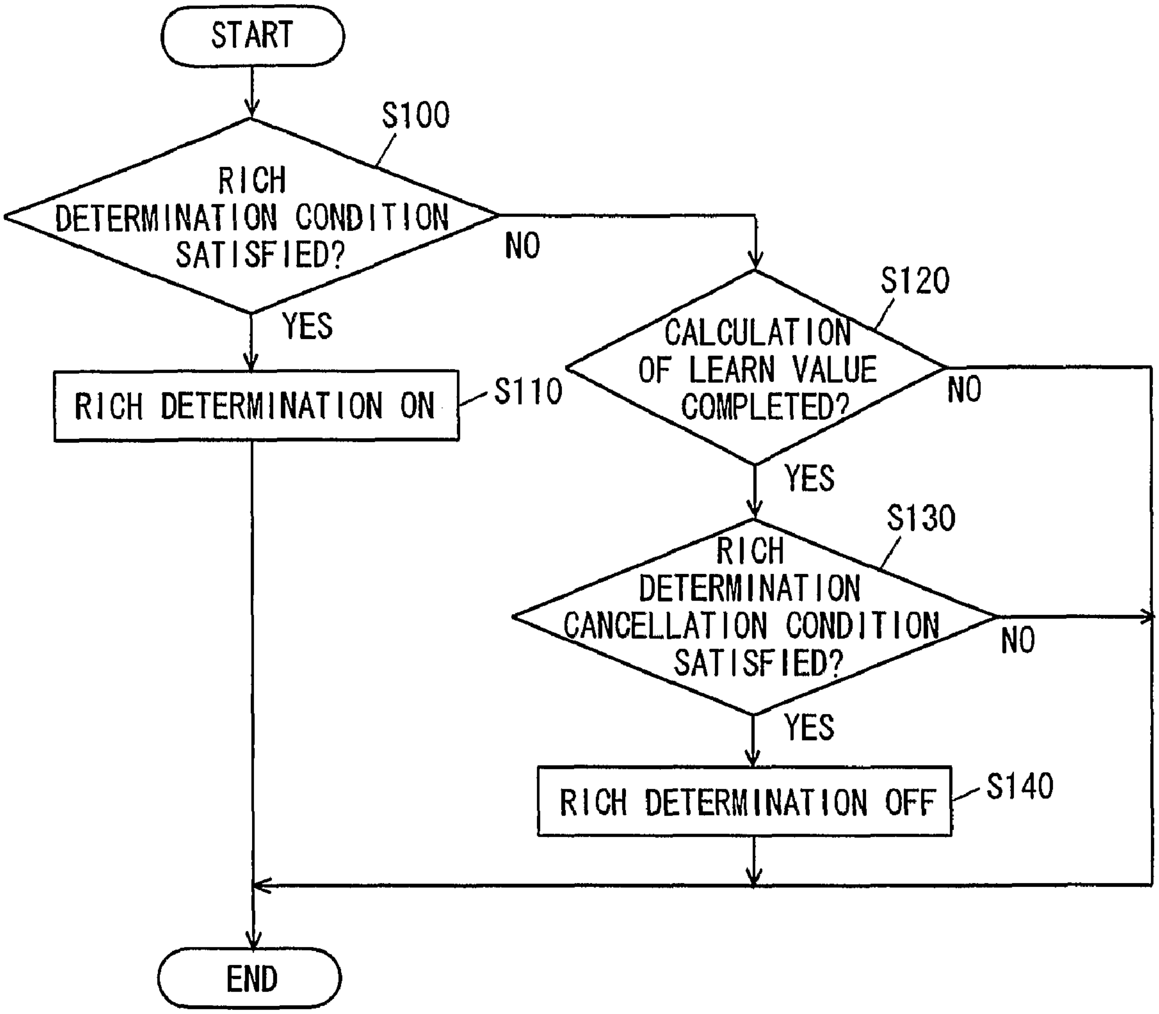
FIGS. 5-7 are flowcharts each illustrating a control structure of a program executed by an engine ECU identified as the control apparatus according to the embodiment of the present invention.

Hereinafter, a first control structure of a program that is executed by engine ECU 60 identified as the control apparatus according to the present embodiment will be described with reference to FIG. 5.

In step (hereinafter, abbreviated as "S") 100, engine ECU 60 determines whether a rich determination condition has been held for a predetermined time or more.

It is determined that the rich determination condition is satisfied when all the following conditions are fulfilled: a condition indicating that learning is possible, including that A/F sensor 530 has been activated; a condition that a predetermined time or more has passed since recovery from fuel cut; a condition that the correction amount for decreasing the fuel injection amount (hereinafter, also referred to as "fuel decrease correction amount") is greater than a threshold value; and a condition that the learning region is unchanged.

Determination as to whether the condition indicating that learning is possible is satisfied or not is made because the air-fuel ratio cannot be detected unless A/F sensor 530 is activated, in which case the learn value cannot be calculated with accuracy.

Determination as to whether the condition that a predetermined time or more has passed since recovery from fuel cut is satisfied or not is made because the air-fuel ratio would be unstable for a while after recovery from the fuel cut; during which the feedback correction amount cannot be calculated with accuracy.

Determination as to whether the condition that the fuel decrease correction amount is greater than a threshold value is satisfied or not is made for the purpose of determining whether there is a high possibility that the fuel injection amount from injector 210, i.e., the fuel injection period will reach the lower limit by conducting the correction to decrease the fuel injection amount.

Determination as to whether the condition that the learning region is unchanged is satisfied or not is made because, if the learning region, i.e., the intake air amount changes, the air-fuel ratio will change even if the fuel injection amount is the same, due to an error included in the detection result of airflow meter 510, in which case the feedback correction amount and/or the air-fuel ratio cannot be calculated with accuracy.

If the rich determination condition has been held for a predetermined time or more (YES in S100), the process proceeds to S110. If not (NO in S100), the process proceeds to S120. In S110, engine ECU 60 sets rich determination ON in the current learning region.

In S120, engine ECU 60 determines whether calculation of the learn value has been completed in the current learning region. Determination as to whether the calculation of the learn value has been completed or not may be made, e.g., by setting a flag at the time point when the learn value has been calculated, and by checking the presence/absence of the flag. If the calculation of the learn value has been completed (YES in S120), the process proceeds to S130. If not (NO in S120), the process is terminated.

In S130, engine ECU 60 determines whether a rich determination cancellation condition has been held for a predetermined time or more.

It is determined that the rich determination cancellation condition is satisfied when a condition that the fuel decrease correction amount obtained from the learn value is smaller than a threshold value (i.e., the learn value is smaller than a threshold value) is satisfied. It is also determined that the rich determination cancellation condition is satisfied when all the following conditions are satisfied: the condition that a predetermined time or more has passed since recovery from the fuel cut; the condition that the correction amount for decreasing the fuel injection amount is smaller than the threshold value; and the condition that the learning region is unchanged.

If the rich determination cancellation condition has been held for a predetermined time or more (YES in S130), the process proceeds to S140. If not (NO in S130), the process is terminated.

In S140, engine ECU 60 turns the rich determination OFF in the current learning region.

Figure 6:
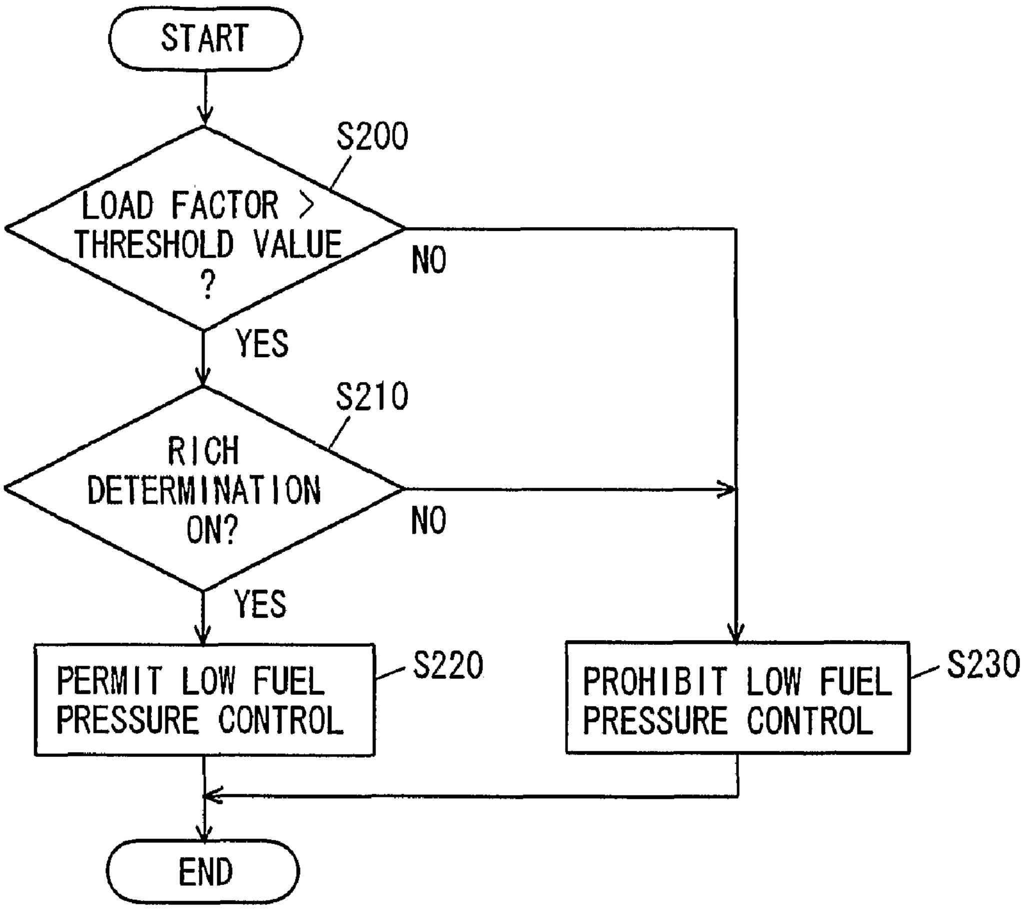

Hereinafter, a second control structure of a program executed by engine ECU 60 identified as the control apparatus according to the present embodiment will be described with reference to FIG. 6.

In S200, engine ECU 60 determines whether the engine load factor is higher than a threshold value. If the engine load factor is higher than the threshold value (YES in S200), the process proceeds to S210. If not (NO in S200), the process proceeds to S230.

In S210, engine ECU 60 determines whether the rich determination is ON in all of the learning regions on the high load side (e.g., the learning region with the largest intake air amount and the learning region with the second largest intake air amount). If the rich determination is ON (YES in S210), the process proceeds to S220. If not (NO in S210), the process proceeds to S230.

In S220, engine ECU 60 permits the low fuel pressure control. In S230, engine ECU 60 prohibits the low fuel pressure control.

Figure 7:
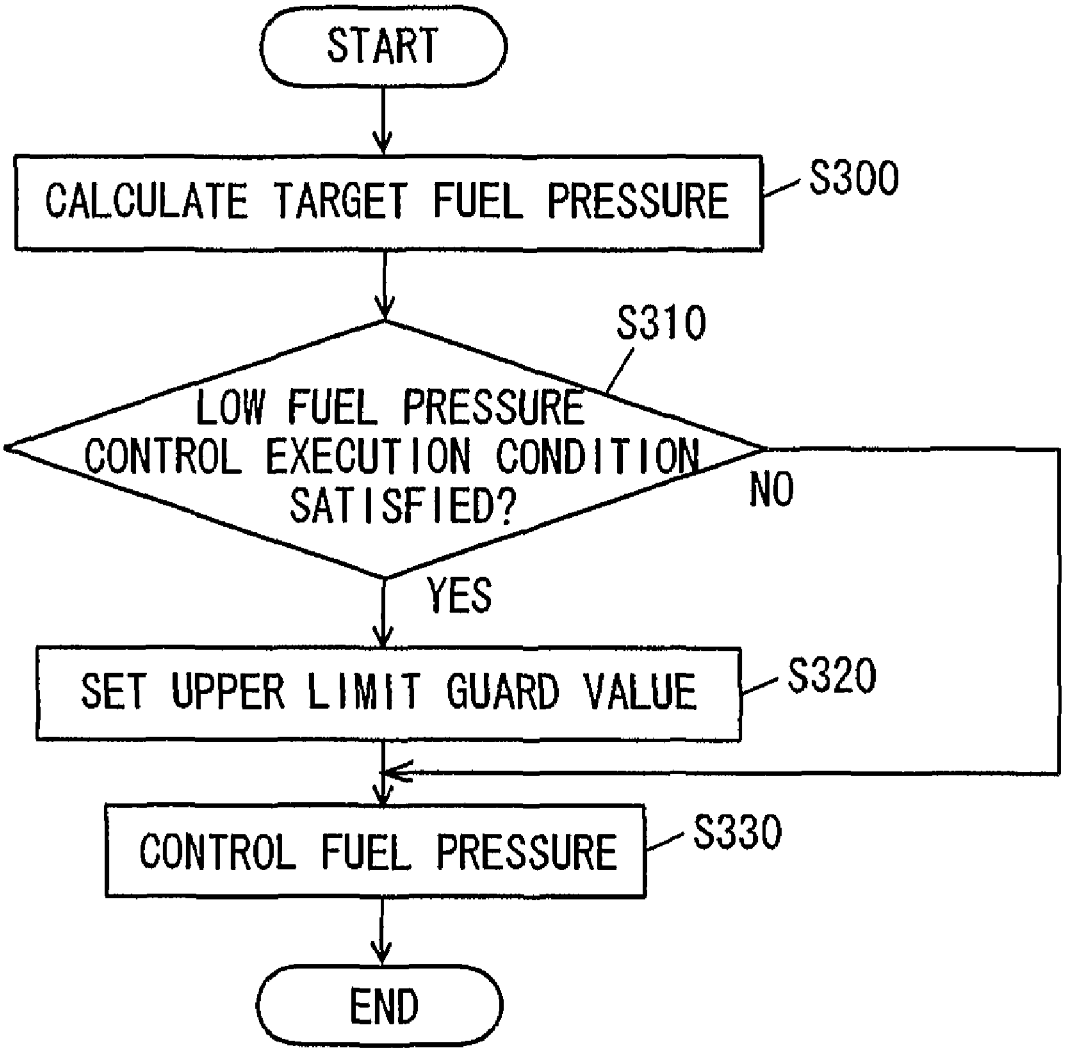

Hereinafter, a control structure of a program that is executed by engine ECU 60, identified as the control apparatus of the present embodiment, for the purpose of controlling the fuel pressure will be described with reference to FIG. 7.

In S300, engine ECU 60 calculates a target fuel pressure based on a map using engine speed NE and the load factor as parameters.

In S310, engine ECU 60 determines whether a low fuel pressure control execution condition has been satisfied. It is determined that the low fuel pressure control execution condition is satisfied when the following conditions are all satisfied: a condition that execution of the low fuel pressure control is permitted; a condition that engine speed NE is lower than a threshold value; and a condition that the atmospheric pressure is higher than a threshold value.

If the low fuel pressure control execution condition is satisfied (YES in S310), the process proceeds to S320. If not (NO in S310), the process proceeds to S330.

In S320, engine ECU 60 carries out the low fuel pressure control, and sets an upper limit guard value of the fuel pressure.

In S330, engine ECU 60 controls the fuel pressure such that it becomes a target fuel pressure within a range not exceeding the upper limit guard value. More specifically, in the case where the target fuel pressure is greater than the upper limit guard value, the fuel pressure is controlled to attain the upper limit guard value. In the case where the upper limit guard value has not been set, or in the case where the target fuel pressure is not greater than the upper limit guard value, the fuel pressure is controlled to attain the target fuel pressure.

An operation of engine ECU 60 that is the control apparatus according to the present embodiment based on the above-described structure and flowcharts will now be described.

During the operation of the engine, in the event that the actual fuel injection amount becomes excessive compared to the target fuel injection amount due to a trouble in the fuel supply system including injector 210 for example, the air-fuel ratio becomes richer than the target air-fuel ratio. In such a case, correction (lean correction) to decrease the fuel injection amount is carried out by feedback control of the air-fuel ratio.

In the state where the condition indicating that learning is possible, the condition that a predetermined time or more has passed since recovery from the fuel cut, and the condition that the learning region is unchanged are all satisfied, the air-fuel ratio may be calculated with accuracy. The fuel decrease correction amount in this state is highly reliable.

Accordingly, the rich determination is set ON (S110) in the case where the condition indicating that learning is possible, the condition that a predetermined time or more has passed since recovery from the fuel cut, the condition that the learning region is unchanged, and the condition that the fuel decrease correction amount is greater than a threshold value, have all been held for a predetermined time or more (YES in S100).

In this state, the fuel decrease correction amount is large. Thus, in the state where the required fuel injection amount is small, as in the low speed and low load operation, the fuel injection amount would further be decreased, leading to a shorter fuel injection period. When the fuel injection period becomes as short as a lower limit of the fuel injection period, the injection period cannot be made shorter any more. This means that the fuel injection amount cannot be decreased to the extent that the air-fuel ratio can reach the target air-fuel ratio (e.g., stoichiometric air-fuel ratio).

Thus, when the low fuel pressure control execution condition is satisfied with fulfillment of the conditions that execution of the low fuel pressure control is permitted, that engine speed NE is lower than the threshold value, and that the atmospheric pressure is higher than the threshold value (YES in S310), an upper limit guard value lower than the target fuel pressure in the low load region is set (S320), and the fuel pressure is controlled so as not to exceed the upper limit guard value (S330).

This allows the fuel pressure to be lowered in the low load region, and thus, the fuel injection amount can be decreased even if the fuel injection period is consistent with its lower limit. As a result, it is possible to accurately control the air-fuel ratio.

At this time, if the rich determination on the high load side is ON (YES in S210) in the operation state where the engine load factor is higher than the threshold value (YES in S200), the low fuel pressure control is permitted (S220). Otherwise, the low fuel pressure control is prohibited (S230).

In this manner, it is possible to switch from the normal fuel pressure control to the low fuel pressure control only in the high load region where the difference between the target fuel pressure and the upper limit guard value is small. As such, a sudden change of the fuel pressure in the low load region where the difference between the target fuel pressure and the upper limit guard value is large can be suppressed, to thereby prevent sudden degradation in atomization of the fuel. As a result, it is possible to suppress a sudden change of the combustion state and, hence, large variation of the engine output.

Further, if the rich determination is ON (YES in S210) as the fuel decrease correction amount on the high load side is greater than the threshold value, the low fuel pressure control is permitted (S220); otherwise, the low fuel pressure control is prohibited. Thus, it is possible to switch from the normal fuel pressure control to the low fuel pressure control before the fuel injection amount decreases, i.e., before the fuel injection period reaches the lower limit.

This can restrict a sudden change in fuel pressure in the state where the combustion state is unstable due to an insufficient fuel injection amount, as in the case of the low load region, to thereby suppress sudden degradation in atomization of the fuel. The combustion state is prevented from becoming more unstable. As a result, it is possible to suppress large variation in the engine output.

Further, the low fuel pressure control execution condition is not satisfied unless the condition that engine speed NE is lower than the threshold value is satisfied (NO in S310), and the upper limit guard value is not set. Thus, the fuel pressure is not lowered in the high speed state. As such, it is possible to suppress lowering of the fuel pressure in the high speed and low load operation. It can suppress the undesirable situation where the fuel pressure does not increase rapidly when the high speed and low load operation is changed to the high speed and high load operation, which would otherwise lead to an insufficient fuel injection amount. As a result, it is possible to suppress an increase in temperature of catalyst 200 because of the exhaust having an excessively high air-fuel ratio being introduced to catalyst 200.

Furthermore, the low fuel pressure control execution condition is not satisfied unless the condition that the atmospheric pressure is higher than the threshold value is satisfied (NO in S310), and the upper limit guard value is not set. Thus, the fuel pressure is not lowered. It can suppress the undesirable situation where the low fuel pressure control is executed in the state where particularly the idling speed is lower than usual due to an insufficient intake air amount. As such, it is possible to suppress engine stall that would occur when the low idling speed is further lowered.

As described above, according to the engine ECU that is the control apparatus of the present embodiment, the low fuel pressure control is permitted only in the operation state where the engine load factor is higher than a threshold value. Thus, the normal fuel pressure control can be switched to the low fuel pressure control only in the high load region where the difference between the target fuel pressure and the upper limit guard value is small. In the low load region where the difference between the target fuel pressure and the upper limit guard value is large, a sudden change in fuel pressure can be suppressed, to thereby suppress sudden degradation in atomization of the fuel. As a result, it is possible to prevent large variation in engine output due to the sudden change of the combustion state.

Further, the low fuel pressure control is permitted when the rich determination is ON as the fuel decrease correction amount on the high load side is greater than a threshold value. As such, the normal fuel pressure control can be switched to the low fuel pressure control before the fuel injection amount becomes small, i.e., before the fuel injection period reaches the lower limit. Accordingly, a sudden change in fuel pressure in the state where the combustion state is unstable due to an insufficient fuel injection amount, as in the low load region or the like, can be suppressed, and thus, sudden degradation in atomization of the fuel can be suppressed. As a result, it is possible to prevent the combustion state from becoming further unstable, and thus to prevent large variation in output of the engine.

Furthermore, the low fuel pressure control execution condition is not satisfied unless the condition that the atmospheric pressure is higher than the threshold value is satisfied, and the fuel pressure is not lowered. Thus, execution of the low fuel pressure control particularly in the state where the idling speed is lower than usual due to an insufficient intake air amount can be suppressed. Accordingly, a further reduction of the idling speed, and hence, large variation in output of the engine leading to engine stall can be suppressed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control apparatus for an engine, comprising:

a control portion controlling a fuel injection mechanism injecting fuel;

a correcting portion correcting a fuel injection amount;

an adjusting portion executing one of first control for adjusting a pressure of said fuel to be a first pressure and second control for adjusting the pressure to be a second pressure lower than said first pressure; and a switching portion switching from said first control to said second control when a correction amount for decreasing the fuel injection amount is greater than a predetermined correction amount.

2. The control apparatus for an engine according to claim 1, wherein said correcting portion performs correction to decrease the fuel injection amount when an air-fuel ratio in said engine is lower than a predetermined air-fuel ratio.

3. A control apparatus for an engine, comprising:

control means for controlling fuel injection means for injecting fuel;

correcting means for correcting a fuel injection amount;

adjusting means for executing one of first control for adjusting a pressure of said fuel to be a first pressure and second control for adjusting the pressure to be a second pressure lower than said first pressure; and means for switching from said first control to said second control when a correction amount for decreasing the fuel injection amount is greater than a predetermined correction amount.

4. The control apparatus for an engine according to claim 3, wherein said correcting means includes means for performing correction to decrease the fuel injection amount when an air-fuel ratio in said engine is lower than a predetermined air-fuel ratio.

5. A control apparatus for an engine, comprising an ECU controlling an injector injecting fuel, said ECU being configured to correct a fuel injection amount, execute one of first control for adjusting a pressure of said fuel to be a first pressure and second control for adjusting the pressure to be a second pressure lower than said first pressure, and switch from said first control to said second control when a correction amount for decreasing the fuel injection amount is greater than a predetermined correction amount.

* * * * *